US012374176B2

(12) United States Patent
Salter et al.

(10) Patent No.: US 12,374,176 B2
(45) Date of Patent: Jul. 29, 2025

(54) SYSTEMS AND METHODS TO SECURE ITEMS STORED IN A CARGO AREA OF A VEHICLE

(71) Applicant: Ford Global Technologies, LLC, Dearborn, MI (US)

(72) Inventors: Stuart C. Salter, White Lake, MI (US); Brendan Diamond, Grosse Pointe, MI (US); David Celinske, Wolverine Lake, MI (US); Erick Mogollon, Bloomfield Hills, MI (US); Fernando Camargo, Dearborn, MI (US)

( * ) Notice: Subject to any disclaimer, the term of this patent is extended or adjusted under 35 U.S.C. 154(b) by 71 days.

(21) Appl. No.: 18/153,424

(22) Filed: Jan. 12, 2023

(65) Prior Publication Data

US 2024/0242553 A1 Jul. 18, 2024

(51) Int. Cl.
*G07C 9/00* (2020.01)

(52) U.S. Cl.
CPC ................................ *G07C 9/00896* (2013.01)

(58) Field of Classification Search
None
See application file for complete search history.

(56) References Cited

U.S. PATENT DOCUMENTS 9,475,369 B2 10/2016 Sugiura et al.
10,023,151 B2 * 7/2018 Samadani ............. B60K 28/08
10,072,453 B2 9/2018 Ihlenburg et al.
10,107,026 B2 * 10/2018 Dezorzi ................... G07C 9/28
10,723,275 B2 7/2020 Skikun et al.
11,001,228 B2 5/2021 Skikun et al.
11,830,331 B2 * 11/2023 Doyle .................... G08B 13/06
2008/0110948 A1 * 5/2008 Sutter .................... A01K 97/08 224/539
2008/0224859 A1 * 9/2008 Li .......................... G07C 9/257 340/540
2014/0340032 A1 * 11/2014 Curtis .................... H02J 50/12 320/108

(Continued)

OTHER PUBLICATIONS

K. Reif, Vehicle Security Systems, Robert Bosch GmbH, Automotive Mechatronics, Bosch Professional Automotive Information, Aug. 26, 2014, 488-495.

(Continued)

*Primary Examiner* — Carlos Garcia
(74) *Attorney, Agent, or Firm* — Frank Lollo; Eversheds Sutherland (US) LLP

(57) ABSTRACT

The disclosure is generally directed to systems and methods for securing an item in a vehicle. An example method can include a processor receiving a primary trigger to unlock a gate of the vehicle, followed by unlocking of the gate to allow access to a cargo compartment. A secondary trigger may then be received for unlocking a security lock that is a part of a cargo item holder located in the cargo compartment. The processor may perform an authentication procedure upon the secondary trigger and unlock the security lock, based on a successful authentication of the secondary trigger. In an example implementation, the cargo item holder is a gun rack that includes a security lock, the primary trigger can be a signal produced by activating a pushbutton switch, and the secondary trigger can be a spoken command, a signal generated by a smart tag, or an image of an individual.

17 Claims, 4 Drawing Sheets

(56) References Cited

U.S. PATENT DOCUMENTS

| | | | | |
|---|---|---|---|---|
| 2017/0162030 | A1* | 6/2017 | Rajnath | F41A 17/063 |
| 2019/0174304 | A1* | 6/2019 | Tunnell | H04L 63/0838 |
| 2019/0371067 | A1* | 12/2019 | Simari | G06T 19/20 |
| 2022/0001767 | A1* | 1/2022 | Kim | B60R 5/02 |
| 2022/0079368 | A1* | 3/2022 | Hall | B62D 31/025 |
| 2022/0080873 | A1* | 3/2022 | Hall | B60P 3/007 |
| 2022/0080875 | A1* | 3/2022 | Hall | B65D 88/12 |
| 2022/0083968 | A1* | 3/2022 | Hall | B62D 33/042 |
| 2022/0189223 | A1* | 6/2022 | Carter | H04N 7/186 |
| 2022/0189263 | A1* | 6/2022 | Doyle | E05G 1/10 |

OTHER PUBLICATIONS

Jianguo Liu et al., Vision-Based Feet Detection Power Liftgate with Deep Learning on Embedded Device, Journal of Physics: Conference Series, Jun. 1, 2022, 1-8.

* cited by examiner

SYSTEMS AND METHODS TO SECURE ITEMS STORED IN A CARGO AREA OF A VEHICLE

BACKGROUND

Most vehicles that are used for personal purposes typically include a cargo area that may be used for transporting items such as, for example, an item of luggage, groceries, picnic supplies, and a set of golf clubs. It is desirable that these items be stored securely in the vehicle so as to prevent them from being stolen.

Vehicles that are used for professional purposes such as, for example, a police vehicle, an ambulance, an emergency vehicle, or a fire truck, are also typically used for transporting items such as, for example, firearms, medical equipment, medicines, and rescue equipment. It is desirable to secure these items as well, particularly in view of conditions where a driver of such a vehicle (a police officer, a medical professional, a fireman, etc.,) may have to exit the vehicle in a hurry and may not have time to ensure that the items are secured.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
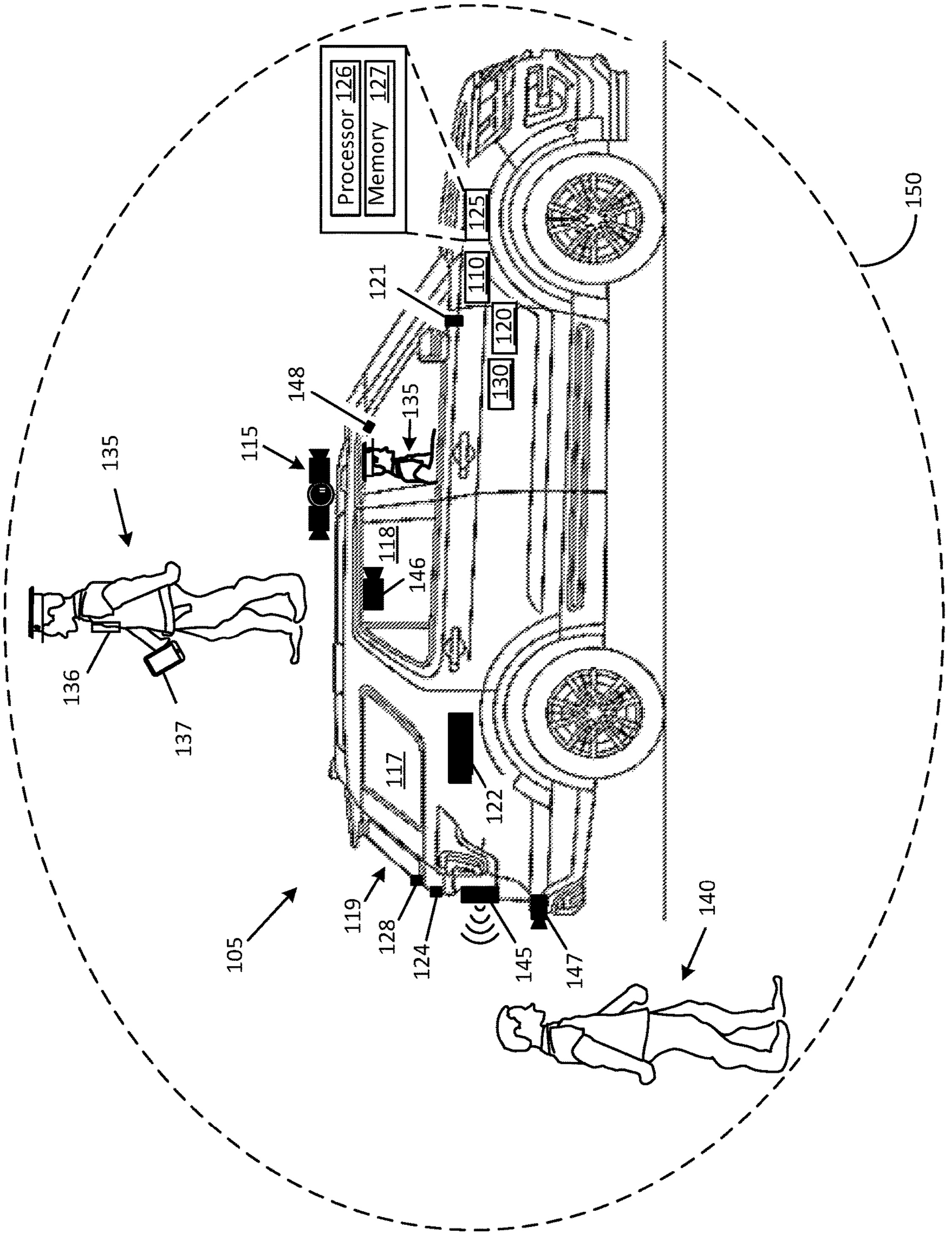
FIG. 1 shows an example vehicle that includes a cargo item security system in accordance with an embodiment of the disclosure.

In terms of a general overview, embodiments described in this disclosure are generally directed to systems and methods for securing an item in a cargo compartment of a vehicle. An example method executed by a processor of a cargo item security system in a vehicle (such as, for example, a law-enforcement vehicle), can include receiving a primary trigger to unlock a gate of the vehicle. In an example implementation, the processor may respond to the primary trigger by unlocking the gate to allow access to a cargo compartment of the vehicle. The method may further include the processor receiving a secondary trigger to unlock a security lock that is a part of a cargo item holder located in the cargo compartment. The processor may perform an authentication procedure upon the secondary trigger and unlock the security lock of the cargo item holder based on a successful authentication of the secondary trigger. In an example implementation, the cargo item holder is a gun rack that includes a plurality of security locks securing a plurality of gun clamps. The primary trigger can be a signal produced by activating a pushbutton switch, a toggle switch, or an icon on a touchscreen display, and the secondary trigger can be a spoken command, a signal generated by a smart tag, or based on the processor evaluating an image of an individual.

Illustrative Embodiments

The disclosure will be described more fully hereinafter with reference to the accompanying drawings, in which example embodiments of the disclosure are shown. This disclosure may however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, it must be understood that the word "gate" as used herein with respect to a vehicle refers to any of various doors of the vehicle as well as other parts of the vehicle that provide access to an enclosed space inside the vehicle. These other parts of the vehicle can include, for example, a trunk lid, a lift gate, a tail gate, a panel or the like, and a frunk lid (cover for a front trunk of a vehicle such as, for example, an electric vehicle). The phrase "cargo compartment" as used herein refers to any portion of a vehicle in which an item or object (such as, for example, a piece of luggage, a firearm, a medicine cabinet, a tool, a piece of equipment, etc.), can be stored. Such portions of the vehicle may include, for example, a trunk of the vehicle, a frunk of the vehicle, a cabin area of a vehicle (behind the rear seat of a van or a sports utility vehicle (SUV), for example). The phrase "cargo compartment" as used herein further encompasses any container that may be attached to, or mounted upon, a vehicle, such as, for example, a box mounted upon a luggage rack on top of the vehicle, or a container placed on (or attached to) the bed of a truck. The example box or example container can include a security lock and the description provided herein with respect to a gate of a vehicle and a gate lock of the gate is equally applicable to the box/container and the security lock of the box/container. The word "lock" as used herein refers to a security component that can be locked or unlocked by a control mechanism (an electronic circuit, a servomotor, a relay, a latch, etc.). The word "image" as used herein is merely one example of "data" or "information" in accordance with the disclosure. Other forms of data may include sensor signals captured by use of various types of sensors provided in a vehicle (radar detectors, infrared sensors, motion detectors, etc.). The images/photographs referred to herein in accordance with the disclosure may be obtained by use of various types of image capture devices (still camera, digital camera, video camera, smartphone, etc.). The various forms of images/photographs can include still photographs, video clips, real-time video, movies, still frames etc. A still frame is a single static image that may be obtained from a video clip or a video stream. A video clip is generally composed of a set of images that are captured sequentially over a period of time. Thus, a description below with respect to a single image is equally applicable to a video clip for example. The phrase "cooperate with" as used herein refers to a communicative coupling and communications carried out between two devices via communications links (wired and/or wireless communication links) for purposes of conveying, exchanging, and/or sharing information between the two devices. The word "vehicle" as used in this disclosure can pertain to any one of various types of vehicles such as, for example, cars, vans, sports utility vehicles, trucks, electric vehicles, gasoline vehicles, and hybrid vehicles. Furthermore, the description provided herein is applicable to various vehicles incorporating various kinds of driving automation such as, for example, the six levels of driving automation that is defined by the Society of Automotive Engineers (SAE) as ranging from Level 0 (fully manual) to Level 5 (fully autonomous).

It must also be understood that words such as "implementation," "application," "scenario," "case," and "situation" as used herein are an abbreviated version of the phrase "In an example ("implementation," "application," "scenario," "case," "approach," and "situation") in accordance with the disclosure." It must also be understood that the word "example" as used herein is intended to be non-exclusionary and non-limiting in nature.

FIG. 1 shows a vehicle 105 that includes a cargo item security system 125 in accordance with an embodiment of the disclosure. The cargo item security system 125 can include a processor 126 that is configured to execute computer-executable instructions stored in a memory 127 for performing various operations in accordance with the disclosure. The vehicle 105 may further include components such as, for example, a vehicle computer 110, a communications system 120, and a data acquisition system 130. In an example scenario, the vehicle 105 is a law-enforcement vehicle such as, for example, a police sedan. However, in other scenarios, the vehicle 105 can be any of various types of vehicles operated by various types of entities. In this case, the vehicle 105 is a driver-operated vehicle and the driver of the vehicle 105 is a law-enforcement officer 135. In other cases, the vehicle 105 can be driven by various other types of individuals, such as, for example, an emergency services responder or a private security officer.

In the illustrated example, the vehicle 105 is a station wagon having a cabin area 118 and a cargo area 117. The cargo area 117 may be separated from the cabin area 118 by a reinforced steel mesh partition (not shown). Another steel partition may be provided between a driver portion of the cabin area 118 and a rear passenger portion of the cabin area 118. The rear passenger portion of the cabin area 118 may include seats and fixtures that are configured for transporting an individual (such as a law-breaker, for example) to a police station.

The cargo area 117 may be accessed from outside the vehicle 105 by opening a gate 119. The gate 119, which can be a lift gate, includes a gate lock 124 that can be activated by pushing a gate lock activation button 121 provided in the cabin area 118 of the vehicle 105. The gate lock 124 can include electronic circuit components, such as, for example, a wireless receiver that is configured to receive wireless signals from the cargo item security system 125. The gate lock activation button 121 can be provided in various forms such as, for example, in the form of a push button switch that may be depressed for activating the gate lock 124, a toggle switch that may be toggled for activating the gate lock 124, or an icon on a touchscreen display that may be touched for activating the gate lock 124. The gate lock activation button 121 may be provided at other locations in other vehicles such as, for example, on a panel located in a cargo area, on a panel located on a side wall of a truck bed, or on a drop gate of a truck.

In an example scenario, a cargo item holder 122 is located in the cargo area 117. Placing the gate lock 124 of the gate 119 in a locked condition can prevent access to the cargo item holder 122 from outside the vehicle 105.

In an example embodiment, the cargo item holder 122 is a gun rack that may be used to hold and to secure one or more firearms for use by the law-enforcement officer 135. In other embodiments, the cargo item holder 122 can be, for example, a box or safe in which a cargo item is stored.

The vehicle computer 110 may be operated to execute various operations related to the vehicle 105, such as, for example, controlling engine operations (fuel injection, speed control, emissions control, braking, etc.), managing climate controls (air conditioning, heating etc.), activating airbags, and issuing alerts (check engine light, bulb out, low tire pressure, etc.), and also for executing various operations in accordance with disclosure.

In this case, the vehicle computer 110 responds to actions performed by the law-enforcement officer 135 (such as, for example, reducing the speed of the vehicle 105 when the law-enforcement officer 135 executes a braking operation, moving the vehicle 105 at a cruising speed when the law-enforcement officer 135 applies cruise control, and selecting an appropriate gear when the law-enforcement officer 135 steps on the accelerator).

In another example scenario, the vehicle 105 is an autonomous vehicle and the vehicle computer 110 performs some or all of various operations that may replicate those performed by the law-enforcement officer 135. More particularly, the vehicle computer 110 of the autonomous vehicle can be configured to cooperate with the cargo item security system 125 to perform some operations in accordance with the disclosure, without the involvement of the law-enforcement officer 135. An example operation carried out by the vehicle computer 110 of an autonomous vehicle may involve activating a lock on a gate of the vehicle 105 upon receiving a command from the cargo item security system 125 to do so. The command may be generated by the cargo item security system 125 based on evaluating data obtained from the data acquisition system 130 (an image, a sensor signal, etc.).

The data acquisition system 130 can include various types of sensors, detectors, and data capture devices. A few examples of such sensors, detectors, and data capture devices can include a camera, a microphone, an ultrasonic sensor, a radar detector, a light detection and ranging (LI- DAR) detector, and a global positioning system (GPS) device. Sensors and detectors such as the ultrasonic sensor, the radar detector, and the LIDAR detector may be configured as object detectors for detecting objects that may be located outside the vehicle 105 and in some embodiments, cooperate with the GPS device for identifying a position of one or more of the objects with respect to the vehicle 105. In an example implementation of such an embodiment, the processor 126 of the cargo item security system 125 may define a geofence 150 around the vehicle 105. The geofence can have any of various shapes (circle, oval, square, rectangular, polygonal, etc.) and be any of various sizes (such as, for example, configured to detect an object that is located 10 feet from any part of the vehicle 105, 5 feet from the gate 119 of the vehicle 105, 2 feet from the driver-side front door, etc.). In an example case, the geofence 150 may be defined on the basis of GPS coordinates. A radar detector, for example, may cooperate with a GPS device to not only identify if an object is located inside or outside the geofence 150, but also identify a precise location of the object with respect to the vehicle 105 (defined in the form of GPS coordinates, for example).

In the illustrated example, the detection devices provided in the vehicle 105 include an imaging system 115 mounted on the roof of the vehicle 105, a camera 146 mounted in the cabin area 118 of the vehicle 105, a camera 147 mounted on a rear bumper or the gate 119 of the vehicle 105, a microphone 148 mounted on a ceiling or an instrument panel of the vehicle 105, a microphone 128 mounted on the gate 119 or on a part adjacent to the gate 119, and a radar detector 145 mounted on the gate 119 or on a part adjacent to the gate 119.

In an example implementation, the imaging system 115 includes multiple cameras arranged to provide a 360° view all around the vehicle 105 and to convey to the cargo item security system 125, captured images of multiple objects all around the vehicle 105. The multiple cameras of the imaging system 115 can be any of various types of cameras, such as, for example, a digital camera that captures digital images, a video camera that produces video clips and/or streaming video, and a night-vision camera that captures images and/or video in low light conditions. The images, video, and/or streaming video may be conveyed to the cargo item security system 125 in real time, near-real time, or on as-needed basis.

The cargo item security system 125 may evaluate the images, video, and/or streaming video for various purposes such as, for example, to detect the presence of an individual in the vicinity of the vehicle 105, and/or to identify the individual. In an example scenario, the cargo item security system 125 may receive from the imaging system 115, a sequence of images and/or video, of the law-enforcement officer 135 walking outside the vehicle 105 and towards the rear of the vehicle 105. The cargo item security system 125 may evaluate the sequence of images and/or video to determine whether the law-enforcement officer 135 is moving towards the cargo area 117.

In the example illustration, the law-enforcement officer 135 is carrying a personal device 137 and is wearing a smart tag 136. The personal device 137 can, for example, be a smartphone. In an example implementation, the smartphone is configured as a phone-as-a-key (PaaK) device that can be used for performing various actions such as, for example, locking/unlocking a door of the vehicle 105, operating an ignition switch of the vehicle to start the vehicle 105, and arming/disarming a security system of the vehicle 105.

In this case, the personal device 137 is configured to communicate with the cargo item security system 125 for performing various operations in accordance with the disclosure. An example operation that may carried out by the personal device 137 may involve recognizing a spoken command uttered by the law-enforcement officer 135. In an example case, the spoken command may be a spoken directive to the cargo item security system 125 for opening the gate 119 of the vehicle 105 so as to allow the law-enforcement officer 135 to access an object stored in the cargo area 117.

The spoken command is one example of a secondary trigger provided to the cargo item security system 125 to unlock the gate lock 124 of the gate 119. The cargo item security system 125 may receive, identify, and evaluate the spoken command (recognize, identify, and verify authorization) and unlock the gate lock 124. In an example implementation, the cargo item security system 125 may perform certain actions in response to the secondary trigger only after a primary trigger has been received. One example of a primary trigger is activation of the gate lock activation button 121.

The smart tag 136, which can be an active device or a passive device, is configured to communicate with the cargo item security system 125 for performing various operations in accordance with disclosure. In an example scenario, the cargo item security system 125 may detect the presence of the law-enforcement officer 135 inside the geofence 150 based on communications between the cargo item security system 125 and the smart tag 136.

The cargo item security system 125 may further evaluate a sequence of images and/or video provided to the cargo item security system 125 by the camera 147 to determine whether the law-enforcement officer 135 is facing the gate 119. The radar detector 145 may provide a signal to the cargo item security system 125, which provides confirmation that the law-enforcement officer 135 is standing near the gate 119, and also provides location information of the law-enforcement officer 135 with respect to the gate 119.

The camera 147 and/or the radar detector 145 may also provide to the cargo item security system 125, information about the presence of other individuals in the vicinity of the vehicle 105. In an example scenario, an individual 140 may be present near the vehicle 105. The cargo item security system 125 may evaluate an image of the individual 140 and determine that the individual 140 is not authorized to access any object that is inside the vehicle 105. The evaluation can include, for example, performing a facial recognition procedure and obtaining data from a database for determining an identity of the individual 140 and/or authorization associated with the individual 140.

The camera 146, which may be located in the cabin area 118 of the vehicle 105, is configured to capture images of objects and individuals in the cabin area 118. The images, video and/or streaming video, may be conveyed to the cargo item security system 125 in real time, near-real time, or on as-needed basis. The cargo item security system 125 may evaluate the images, video, and/or streaming video for various purposes such as, for example, to identify the law-enforcement officer 135, authenticate the law-enforcement officer 135, and/or to detect the law-enforcement officer 135 performing an action in accordance with the disclosure. An example action in accordance with the disclosure may involve the law-enforcement officer 135 activating the gate lock activation button 121 to unlock the gate 119, or entering information into a touch screen of an infotainment system in the vehicle 105.

The communication system 120 of the vehicle 105 is configured to support wired and/or wireless communications between the cargo item security system 125 and various devices such as, for example, the data acquisition system 130, the vehicle computer 110, the personal device 137, and the smart tag 136. The wireless communications may be carried out via device-to-device communications and/or via a network (not shown). The device-to-device communications may involve, for example, Bluetooth®, cellular, WiFi, Zigbee®, or near-field-communications (NFC). The network may include any one, or a combination of networks, such as, for example, a local area network (LAN), a wide area network (WAN), a telephone network, a cellular network, a cable network, a wireless network, and/or private/public networks such as the Internet.

Figure 2:
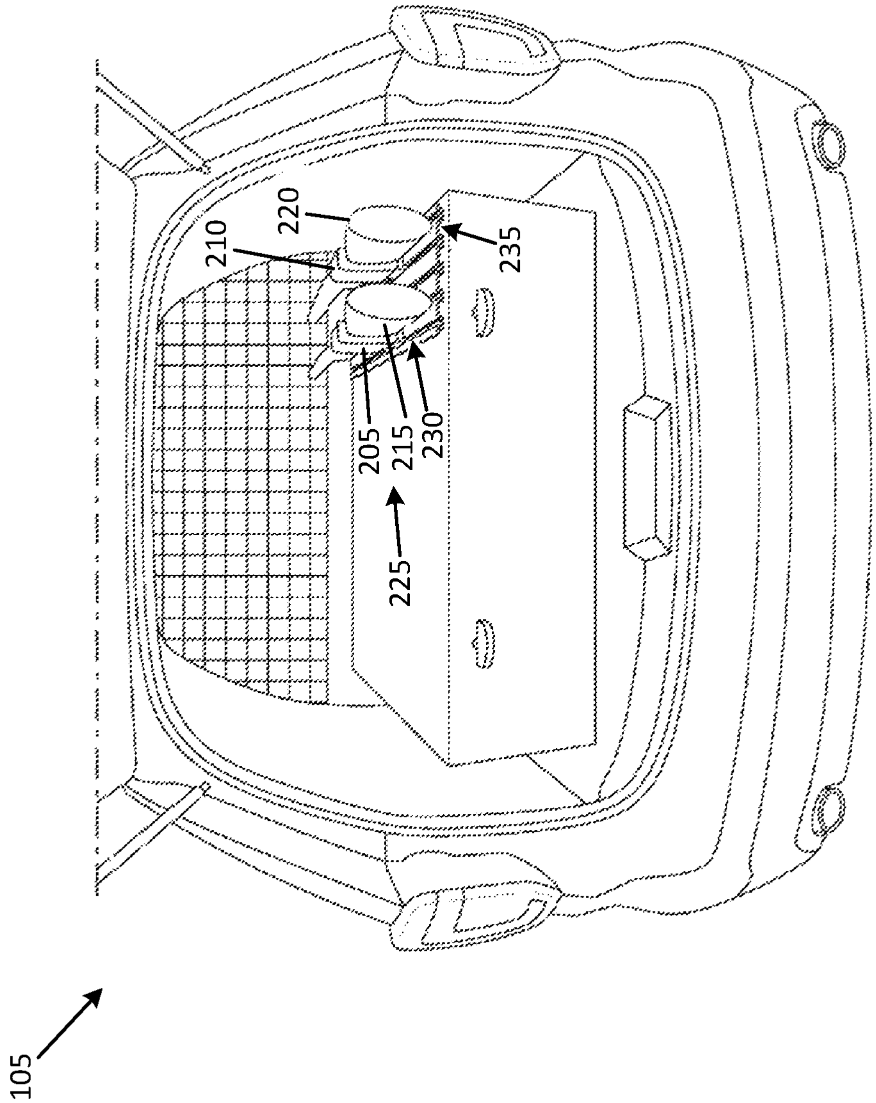
FIG. 2 shows an example cargo item that may be secured by a cargo item security system in accordance with an embodiment of the disclosure.

FIG. 2 shows an example cargo item holder 122 that may be secured by the cargo item security system 125 in accordance with an embodiment of the disclosure. The cargo item holder 122 in this example scenario is a gun rack 225 having two gun clamps. In other embodiments the gun rack 225 can have a single gun clamp or more than two gun clamps. Each gun clamp is built to securely hold any one of various types of guns such as, for example, a shotgun, a rifle, a machine gun, an assault weapon, a revolver, or a handgun. In some cases, two or more of the gun clamps may be identical in shape and construction with respect to each other or may differ in shape and construction with respect to each other. Each gun clamp may be signed a unique identifier such as, for example, slot 1, slot 2, gun 1, gun 2, etc.

Each gun clamp includes parts for securing a gun in the gun clamp. More particularly, in the illustrated example, a first gun clamp 230 includes a security lock 205 for securing a first gun 215 in the first gun clamp 230. The second gun clamp 235 includes a security lock 210 for securing a second gun 220 in the second gun clamp 235. The security lock 205 and the security lock 210 can be individually activated by the cargo item security system 125 via a wireless signal. For example, the security lock 205 can include a wireless receiver that is configured to receive a first wireless signal from the cargo item security system 125 and place the security lock 205 in an unlocked condition. The first wireless signal is transmitted by the cargo item security system 125 based on the cargo item security system 125 receiving a primary trigger followed by a secondary trigger in accordance with the disclosure.

In an example implementation, the primary trigger is a signal produced by activating the gate lock activation button 121 (or by touching an icon on a touch screen of the personal device 137 or the infotainment system). The secondary trigger can be, for example, a spoken command, a signal originated by the personal device 137, a signal originated by the smart tag 136, and/or a signal generated by the cargo item security system 125 based on evaluating an image. Evaluating the image can include, for example, identifying the law-enforcement officer 135 either inside the vehicle 105 or outside the vehicle 105 (and, further, in one case, verifying that the law-enforcement officer 135 is inside the geofence 150 when outside the vehicle 105).

In an example implementation, the security lock 205 may be placed in a locked condition after a time-out period if the gun 215 has not been removed from the first gun clamp 230 after the first wireless signal is received from the cargo item security system 125. The time-out period may be preset such as, for example, 45 seconds. The gate lock 124 of the gate 119 may also be placed in a locked condition after the time-out period if the gun 215 has not been removed from the first gun clamp 230. Placing the gate lock 124 in a locked condition prevents access to the gun rack 225 from outside the vehicle 105.

In another example implementation, the security lock 205 may be retained in an unlocked condition beyond the time-out period in some situations, such as, for example, when the cargo item security system 125 detects a presence of multiple law-enforcement officers near the vehicle 105 or receives a lock over-ride command from the law-enforcement officer 135. The law-enforcement officer 135 may provide the lock over-ride command, for example, under certain circumstances such as, for example, when responding to an armed robbery. In some instances, if it is determined that the vehicle 105 and/or the law-enforcement officer 135 is responding to a specific type of call, such as an armed robbery or the like, the gunlock can remain unlocked until the call is complete.

In another example implementation, the security lock 205 may be placed in a locked condition upon receiving a second wireless signal from the cargo item security system 125 at a later time. The cargo item security system 125 may generate and transmit the second wireless signal under various conditions such as, for example, upon detecting an unauthorized individual (for example, the individual 140 shown in FIG. 1) near the vehicle 105. In an example scenario, the second wireless signal may be transmitted by the cargo item security system 125 prior to expiry of the preset time-out period so as to prevent the unauthorized individual from gaining access to the gun rack 225 ahead of the law-enforcement officer 135 reaching the rear of the vehicle 105.

In another example implementation, the law-enforcement officer 135 may issue a spoken command into the microphone 128 (or the microphone 148) specifying unlocking of a specific gun lock that is to be unlocked by the cargo item security system 125. The spoken command may identify the gun lock in various ways such as, for example, based on a unique identifier (such as, for example, slot 1, slot 2, gun 1, gun 2, etc.) and/or by specifying a type of gun placed in the gun rack 225 (assault rifle, shotgun, etc.).

It must be understood that the description provided above with respect to the first gun clamp 230 is equally applicable to the second gun clamp 235. It must also be understood that the description provided herein with respect to the gun rack 225, the gate 119 of the vehicle 105, and the gate lock 124 of the gate 119, is equally applicable to any of various other types of cargo item holders in any of various other areas of the vehicle 105.

In an example implementation, the cargo item security system 125 can be configured to operate with a cargo item holder located in the cabin area 118 of the vehicle 105 (the gate in this scenario can be a rear door or a front door of the vehicle 105, either on the driver side or the passenger side of the vehicle 105). In another example implementation, the cargo item holder may be located upon a luggage rack of the vehicle 105 and the cargo item security system 125 can be configured to activate one or more locks that may be provided in the cargo item holder. No gate or gate lock is involved in this scenario where the cargo item holder is located upon a luggage rack of the vehicle 105. Accordingly, some of the steps that may be performed in the other procedures can be omitted in this scenario.

Figure 3:
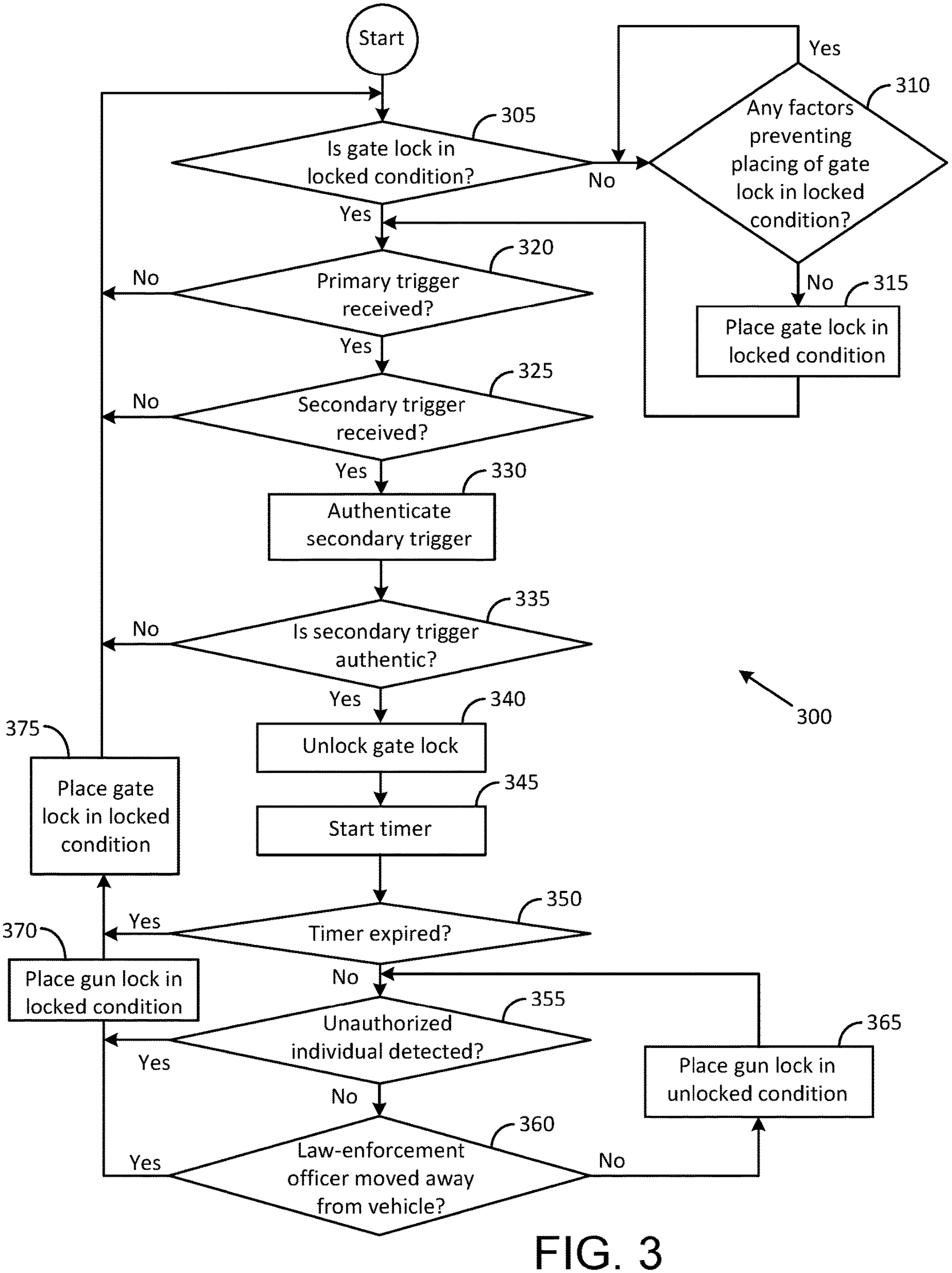
FIG. 3 shows a flowchart of a method to secure a cargo item in accordance with an embodiment of the disclosure.

FIG. 3 shows a flowchart 300 of a method to secure a cargo item in accordance with an embodiment of the disclosure. The flowchart 300 illustrates a sequence of operations that can be implemented in hardware, software, or a combination thereof. In the context of software, the operations represent computer-executable instructions stored on one or more non-transitory computer-readable media such as the memory 127, that, when executed by one or more processors such as the processor 126, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. The description below may make reference to certain items, objects, and individuals shown in FIGS. 1 and 2, but it should be understood that this is done for purposes of explaining certain aspects of the disclosure and that the description is equally applicable to many other embodiments and scenarios involving other items, objects, and individuals.

At block 305, a processor of a cargo item security system such as, for example, the processor 126 of the cargo item security system 125, makes a determination whether a gate lock of a gate of a vehicle is in a locked condition. The gate can be any part of the vehicle that provides entry into the vehicle (a passenger-side door, a driver-side door, a trunk lid, a lift gate, a tail gate, and a frunk lid, for example) and/or access into a cargo area or cargo compartment of the vehicle (a window, for example). An example gate lock 124 that is associated with a gate 119 of the vehicle 105 is illustrated in FIG. 1 and described above.

If, at block 305, it is determined that the gate lock is not in a locked condition, at block 310, the processor makes a determination whether any one or more factors that prevent placing the gate in a locked condition are present. One example factor may be associated with the gate being unlocked and placed in an open condition for purposes of unloading cargo (a suitcase, for example) that may be stored in the cargo area (a trunk of the vehicle, for example). It may be undesirable to close the gate at this time before unloading is completed. Another example factor may be associated with the gate being unlocked and placed in an open condition for purposes of loading items into the cargo area. It may be undesirable to close the gate at this time before loading is completed.

If a factor exists that prevents placing the gate in a locked condition, the processor continues to perform the action indicated at block 310 until placing of the gate in a locked condition becomes feasible.

If no factor exists that prevents placing the gate in a locked condition, at block 315, the processor places the gate in a locked condition.

At block 320, a determination is made by the processor whether a primary trigger has been received by the cargo item security system. In an example scenario, the primary trigger is a signal that is produced by activating a pushbutton switch (or activating a toggle switch, or touching an icon on a touch screen). The processor of the cargo item security system may be configured to receive the primary trigger either directly from the pushbutton switch or via the vehicle computer.

In an example implementation, the gate lock is unlocked as soon as the primary trigger is received by the processor. In this case, block 340 that is shown in the flowchart 300, is omitted. In another example implementation, the gate lock is left in a locked condition after the primary trigger is detected and the actions indicated in block 325 and all subsequent blocks shown in the flowchart 300 are executed.

If, at block 320, it is determined that a primary trigger has not been received, the processor performs the action indicated at block 305 and subsequent actions indicated in each of the blocks leading up to block 320.

If, at block 320, it is determined that a primary trigger has been received, at block 325, a determination is made whether a secondary trigger has been received.

If a secondary trigger has not been received, the processor performs the action indicated at block 305 and subsequent actions indicated in each of the blocks leading up to block 325.

If a secondary trigger has been received, at block 330, an authentication procedure may be executed upon the secondary trigger. In an example scenario, a secondary trigger is received in the form of a spoken command uttered by an individual located inside the vehicle or in the vicinity of the vehicle (inside a geofence defined around the vehicle, for example). The processor may evaluate the spoken command using various techniques such as, for example, voice recognition, voice analysis, template matching, and historical database. The spoken command may be provided in various ways such as, for example, in a format that specifies which security lock of a gun rack is to be unlocked (for example, "Unlock shotgun," "Unlock sniper rifle," or "Unlock gun clamp 1.").

In another example scenario, a secondary trigger is received in the form of an image. The image may be captured by a camera mounted on the vehicle (such as, for example, the imaging system 115 or the camera 147 shown in FIG. 1) and wirelessly transferred to the cargo item security system (cargo item security system 125, for example). The processor of the cargo item security system evaluates the image to identify one or more individuals who may be present in the image. In one case, the image may include a law-enforcement officer, who can be a driver of the vehicle, and may further include another individual, who may be an unauthorized individual, such as, for example, the individual 140 shown in FIG. 1. Identification of the individual(s) present in the image can include the use of various techniques such as, for example, facial recognition, template matching, and/or detecting physical attributes (height, weight, distinguishing mark, etc.).

In another example scenario, a secondary trigger is received in the form of a wireless signal from a device such as, for example, a personal device (smartphone configured as a PaaK, for example) or a smart tag (such as, for example, the personal device 137 and the smart tag 136 shown in FIG. 1). The processor of the cargo item security system may authenticate the received signal by using techniques such as decoding, decryption, and verification, for example.

At block 335, a determination is made whether the secondary trigger is authentic (based on the authentication procedure carried out at block 330). If the secondary trigger is not authentic the processor performs the action indicated in block 305 and subsequent actions indicated in each of the blocks leading up to at least block 335.

If the secondary trigger is authentic, at block 340, the gate lock of the gate of the vehicle is unlocked (such as, for example, the gate lock 124 of the gate 119 of the vehicle 105). The gate lock may be unlocked by use of a wireless signal transmitted by the cargo item security system to the gate lock.

At block 345, a timer is started. In an example implementation, the timer is a software timer that expires after a preset period of time (45 seconds, for example). The preset period of time may be defined by various entities such as, for example, a manufacturer of the cargo item security system, an administrator, a software programmer, or a law-enforcement officer.

At block 350, a determination is made whether the timer has expired. If the timer has expired, at block 375, the gate lock is placed in a locked condition. Placing the gate lock in the locked condition prevents access to the gun rack 225 by unauthorized individuals, when, for example, a law-enforcement officer (driver of the vehicle) is attending to law enforcement activities.

If, at block 350, the timer has not expired, at block 355, a determination is made whether one or more unauthorized individuals are present in the vicinity of the vehicle (for example, inside a geofence defined around the vehicle, or closer than a threshold distance from the vehicle, or near a rear portion of the vehicle, etc.). In an example scenario, the determination may be made by evaluating one or more images captured by one or more cameras provided on the vehicle.

If, at block 355, the determination is made that at least one unauthorized individual is present in the vicinity of the vehicle, at block 370, the gun lock is placed in a locked condition, followed by the gate lock being placed in a locked condition at block 375.

If, at block 355, the determination is made that no unauthorized individual is present in the vicinity of the vehicle, at block 360, a determination is made whether a law-enforcement officer has moved away from the vehicle (for example, has exited a geofence defined around the vehicle, is located farther than a threshold distance from the vehicle, is moving away from the vehicle, etc.). In an example scenario, the determination may be made by evaluating one or more images captured by one or more cameras provided on the vehicle.

If, at block 360, the determination is made that the law-enforcement officer has moved away from the vehicle, at block 370, the gun lock is placed in a locked condition, followed by the gate lock being placed in a locked condition at block 375.

If, at block 360, the determination is made that the law-enforcement officer has not moved away from the vehicle (or is seated inside the vehicle), at block 365, the gun lock of a gun rack (specified, for example, by a spoken command) is placed in an unlocked condition so as to allow the law-enforcement officer to access a gun secured by the gun lock.

The action indicated at block 350 and subsequent actions indicated in subsequent blocks may then be carried out.

Figure 4:
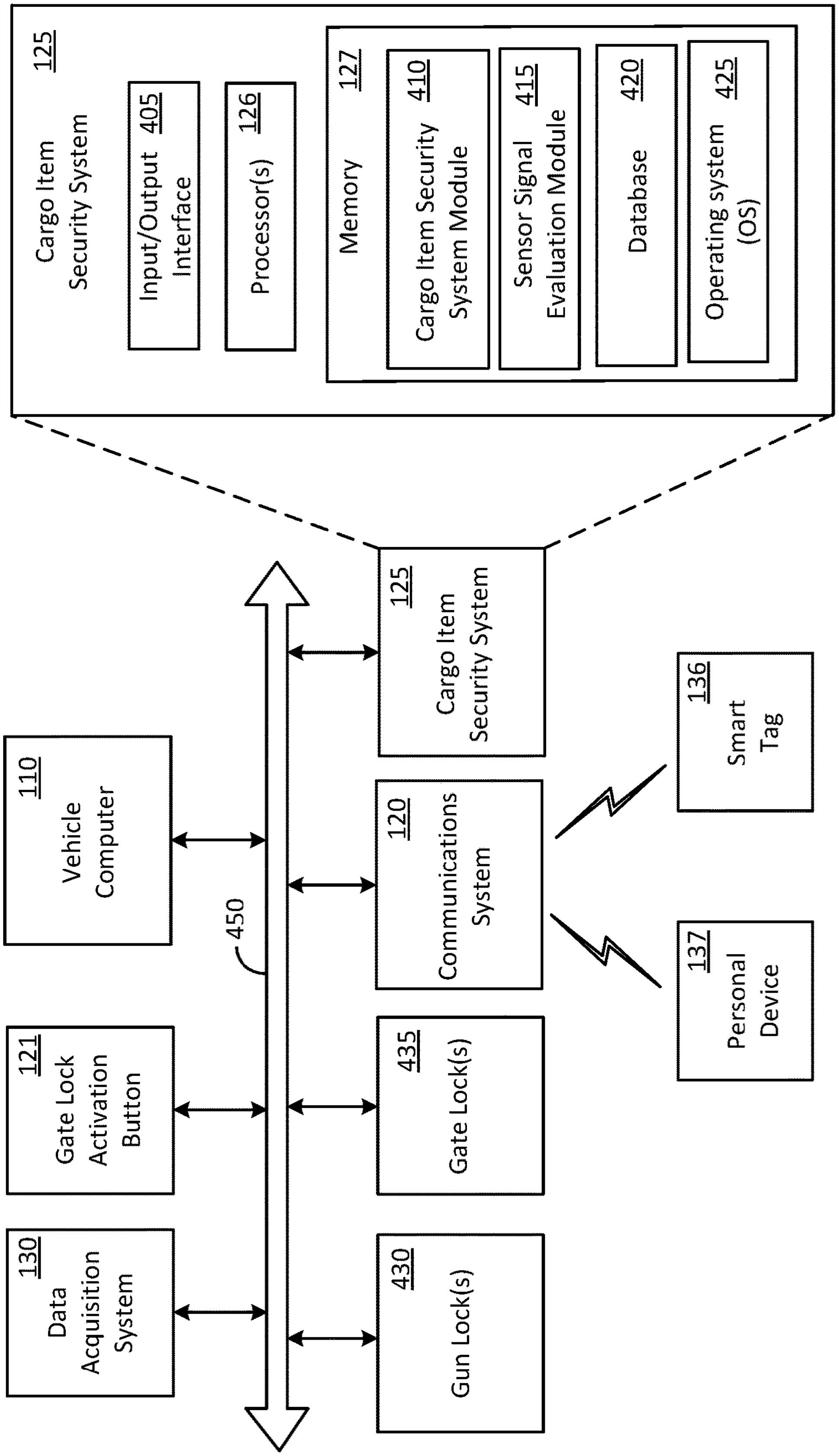
FIG. 4 shows some functional components that may be included in a vehicle that includes a cargo item security system in accordance with an embodiment of the disclosure.

FIG. 4 shows some functional components that may be included in the example vehicle 105 in accordance with an embodiment of the disclosure. The example components can include the data acquisition system 130, the gate lock activation button 121, the vehicle computer 110, gun lock(s) 430, gate lock(s) 435, the communications system 120, and the cargo item security system 125. The various components are communicatively coupled to each other via one or more buses such as an example bus 450. The bus 450 may be implemented using various wired and/or wireless technologies. For example, the bus 450 can be a vehicle bus that uses a controller area network (CAN) bus protocol, a Media Oriented Systems Transport (MOST) bus protocol, and/or a CAN flexible data (CAN-FD) bus protocol. Some or all portions of the bus 450 may also be implemented using wireless technologies such as Bluetooth®, Ultra-Wideband, Wi-Fi, Zigbee®, or near-field-communications (NFC). In an example implementation, a Matter protocol, which is a unifying, IP-based connectivity protocol may be used. The Matter protocol provides interoperability among various devices including artificial intelligence robots, drones, and Internet-of-Things (IoT) platforms.

The data acquisition system 130 can include various types of sensors, detectors, and data capture devices. A few examples of such sensors, detectors, and data capture devices can include a camera, an ultrasonic sensor, a radar detector, a light detection and ranging (LIDAR) detector, a microphone, and a global positioning system (GPS) device. FIG. 1 shows a few example components of the data acquisition system 130. The example components include the imaging system 115, the camera 147, the camera 146, the radar detector 145, the microphone 148, and the microphone 128.

The vehicle computer 110 can be operated to execute various operations related to the vehicle 105, such as, for example, controlling engine operations (fuel injection, speed control, emissions control, braking, etc.), managing climate controls (air conditioning, heating etc.), activating airbags, and issuing alerts (check engine light, bulb out, low tire pressure, etc.), and also for executing various operations in accordance with disclosure.

The gate lock activation button 121 can be activated by an individual such as, for example, the law-enforcement officer 135. Activation of the gate lock activation button 121 (depressing a push button switch, for example) causes a gate lock activation command to be transmitted to a specific gate lock of the vehicle 105. In an example implementation, a first activation of the gate lock activation button 121 may be conveyed to the vehicle computer 110, which then generates a gate unlock command. The gate unlock command is conveyed to a gate lock (such as, for example, the gate lock 124) causing the gate lock to be set in an unlocked condition. A second activation of the gate lock activation button 121 may be conveyed to the vehicle computer 110, which then generates a gate lock command. The gate lock command is conveyed to the gate lock causing the gate lock (such as, for example, the gate lock 124) to be set in a locked condition.

The gate lock(s) 435 are configured to respond to signals received from the gate lock activation button 121 as described above.

The gun lock(s) 430 are configured to secure any of various items placed in a cargo area of the vehicle 105, such as, for example, the security lock 205 and the security lock 210 of the gun rack 225 shown in FIG. 2. The gun lock(s) 430 can be activated by signals generated by the cargo item security system 125 and wirelessly transmitted to the gun lock(s) 430.

The communications system 120 can include various components such as, for example, a wireless transmitter, a wireless receiver, and/or a wireless transceiver, that are configured to allow the cargo item security system 125 to communicate with devices such as, for example, the personal device 137 and the smart tag 136. The communications may be carried out via wireless signals either directly or via a network (not shown) by use of any of various communication formats such as, for example, WiFi, cellular, TCP/IP, Bluetooth®, Ultra-Wideband, Wi-Fi, Ultra-Wideband (UBW), Zigbee®, and near-field-communications (NFC).

In one implementation, the cargo item security system 125 can be an independent device (enclosed in an enclosure, for example). In another implementation, some or all components of the cargo item security system 125 can be housed, merged, or can share functionality, with the vehicle computer 110. For example, an integrated unit that combines the functionality of the cargo item security system 125 with that of the vehicle computer 110 can be operated by a single processor and a single memory device. In the illustrated example configuration, the cargo item security system 125 includes the processor 126, an input/output interface 405, and the memory 127.

The input/output interface 405 is configured to provide communications between the cargo item security system 125 and other components such as the data acquisition system 130 (for obtaining sensor signals and/or captured images).

The memory 127, which is one example of a non-transitory computer-readable medium, may be used to store an operating system (OS) 425, a database 420, and various code modules such as a cargo item security system module 410 and a sensor signal evaluation module 415. The code modules are provided in the form of computer-executable instructions that can be executed by the processor 126 for performing various operations in accordance with the disclosure. The sensor signal evaluation module 415 can be executed by the processor 126 for performing operations such as signal evaluation and image evaluation.

The database 420 may be used to store information such as, for example, images captured by use of the cameras of the data acquisition system 130 and various types of information that may be used for evaluating signals and/or images (including historical information).

The cargo item security system module 410 may be executed by the processor 126 for performing various operations in accordance with the disclosure, including, execution of some operations of the example flow chart 300 described above.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as the memory 127, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may" unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:

receiving, by a processor in a vehicle, a primary trigger to unlock a gate of the vehicle, wherein the primary trigger is a signal produced by activating one of a pushbutton switch, a toggle switch, or an icon on a touchscreen display;

unlocking, by the processor, in response to the primary trigger, the gate to allow access to a cargo compartment of the vehicle;

receiving, by the processor, a secondary trigger to unlock a security lock that is a part of a cargo item holder located in the cargo compartment, wherein the secondary trigger is a different type of trigger than the primary trigger and includes at least one of a spoken directive, an image, or a signal generated by a smart tag;

performing, by the processor, an authentication procedure upon the secondary trigger; and unlocking, by the processor, the security lock, based on a successful authentication of the secondary trigger.

2. The method of claim 1, wherein the cargo item holder is a gun rack and the gate is one of a liftgate, a tailgate, a trunk lid, a frunk lid, a rear gate, a passenger-side door, and a driver-side door.

3. The method of claim 2, wherein the gun rack comprises a plurality of security locks securing a plurality of gun clamps, and wherein the secondary trigger is a spoken command that specifies a first type of gun secured by a first security lock, and wherein the first security lock of the plurality of security locks unlocks instead of a second security lock of the plurality of security locks based on the command specifying the first type of gun secured by the first security lock.

4. The method of claim 1, further comprising:

defining, by the processor, a geofence around the vehicle; and verifying, by the processor, that the smart tag is located inside the geofence.

5. The method of claim 2, wherein the primary trigger is a signal produced by activating one of a pushbutton switch, a toggle switch, or an icon on a touchscreen display, and wherein the secondary trigger is an image, and wherein the method further comprises:

identifying an individual based on at least one of a facial recognition procedure performed upon the image or evaluating a physical attribute of the individual in the image based on executing a search of a database; and determining that the individual is facing the gate.

6. The method of claim 5, further comprising:

defining, by the processor, a geofence around the vehicle; and determining, by the processor, that the individual has moved outside the geofence; and locking, by the processor, the security lock, based on determining that the individual has moved outside the geofence.

7. A method comprising:

receiving, by a processor in a vehicle including a gun rack in a cargo compartment of the vehicle, a primary trigger to unlock a gate of the vehicle;

receiving, by the processor, a secondary trigger including a spoken command, wherein the gun rack comprises a plurality of security locks securing a plurality of gun clamps, and wherein the spoken command specifies a first type of gun secured by a first security lock one of the plurality of gun clamps;

performing, by the processor, an authentication procedure upon the spoken command; and unlocking, by the processor, the first security lock instead of a second security lock of the plurality of security locks based on the command specifying the first type of gun secured by the first security lock and on a successful authentication of the spoken command, wherein the first security lock is associated with the first type of gun and the second security lock is associated with a second type of gun.

8. The method of claim 7, further comprising:

receiving, by the processor, a second signal produced by activating one of a pushbutton switch in the vehicle, a toggle switch in the vehicle, or an icon on a touchscreen display of a personal device; and unlocking, by the processor, in response to receiving the second signal, a gate of the vehicle to allow access to the cargo compartment.

9. The method of claim 7, further comprising:

identifying an individual based on at least one of a facial recognition procedure performed upon a first image or evaluating a physical attribute of the individual in the first image based on executing a search of a database.

10. The method of claim 7, wherein performing the authentication procedure upon the spoken command comprises:

executing a voice recognition procedure upon the spoken command.

11. The method of claim 7, further comprising:

defining, by the processor, a geofence around the vehicle;

determining, by the processor, that a first individual is located inside the geofence;

determining, by the processor, that the first individual is authorized to retrieve a gun stored in the gun rack; and unlocking, by the processor, the first security lock that secures the gun in the gun rack based on determining that the first individual is authorized to retrieve the gun stored in the gun rack.

12. The method of claim 11, further comprising:

determining, by the processor, based on evaluating at least a second image, that the first individual has moved outside the geofence; and locking, by the processor, the first security lock that secures the gun in the gun rack based on determining that the first individual has moved outside the geofence.

13. The method of claim 11, further comprising:

determining, by the processor, based on evaluating at least a second image, that the first individual has moved outside the geofence;

determining, by the processor, based on evaluating at least one of the second image or a third image, that a second individual is located inside the geofence;

determining, by the processor, that the second individual is one of an unauthorized individual or an unidentifiable individual; and locking, by the processor, the first security lock that secures the gun in the gun rack based on determining that the second individual is one of the unauthorized individual or the unidentifiable individual.

14. A vehicle comprising:

a gun rack located in a cargo compartment of the vehicle;

an image capture system configured to capture at least a first image;

a communications receiver configured to receive a spoken command;

a communications interface configured to receive a first signal from a smart tag;

a memory that stores computer-executable instructions; and a processor configured to access the memory and execute the computer-executable instructions to perform operations comprising:

receiving a primary trigger produced by activating one of a pushbutton switch in the vehicle, a toggle switch in the vehicle, or an icon on a touchscreen display of a personal device;

unlocking, in response to receiving the primary trigger, a gate of the vehicle to allow access to the cargo compartment;

receiving a secondary trigger to unlock a security lock that is a part of a cargo item holder located in the cargo compartment, the secondary trigger being a different type of trigger than the primary trigger, the secondary trigger including at least one of the first image, the spoken command, or the first signal from the smart tag;

performing an authentication procedure upon the at least one of the first image, the spoken command, or the first signal from the smart tag; and unlocking a security lock that is a part of the gun rack, based on a successful authentication of the at least one of the first image, the spoken command, or the first signal from the smart tag.

15. The vehicle of claim 14, wherein the gun rack comprises a plurality of security locks securing a plurality of gun clamps, and wherein the spoken command specifies at least one of a first security lock among the plurality of security locks or a type of gun secured by one of the plurality of gun clamps.

16. The vehicle of claim 14, wherein the processor is further configured to access the memory and execute the computer-executable instructions to perform additional operations comprising:

receiving a second image from the image capture system;

determining, based on evaluating at least the second image, that a first individual is located outside the vehicle;

determining that the first individual is authorized to retrieve a gun stored in the gun rack; and unlocking the security lock that secures the gun in the gun rack based on determining that the first individual is authorized to retrieve the gun stored in the gun rack.

17. The vehicle of claim 16, wherein the processor is further configured to access the memory and execute the computer-executable instructions to perform additional operations comprising:

determining, based on evaluating at least one of the second image or a third image, that a second individual is located outside the vehicle;

determining that the second individual is one of an unauthorized individual or an unidentifiable individual; and locking the security lock that secures the gun in the gun rack based on determining that the second individual is one of the unauthorized individual or the unidentifiable individual.

* * * * *